UNITED STATES PATENT OFFICE.

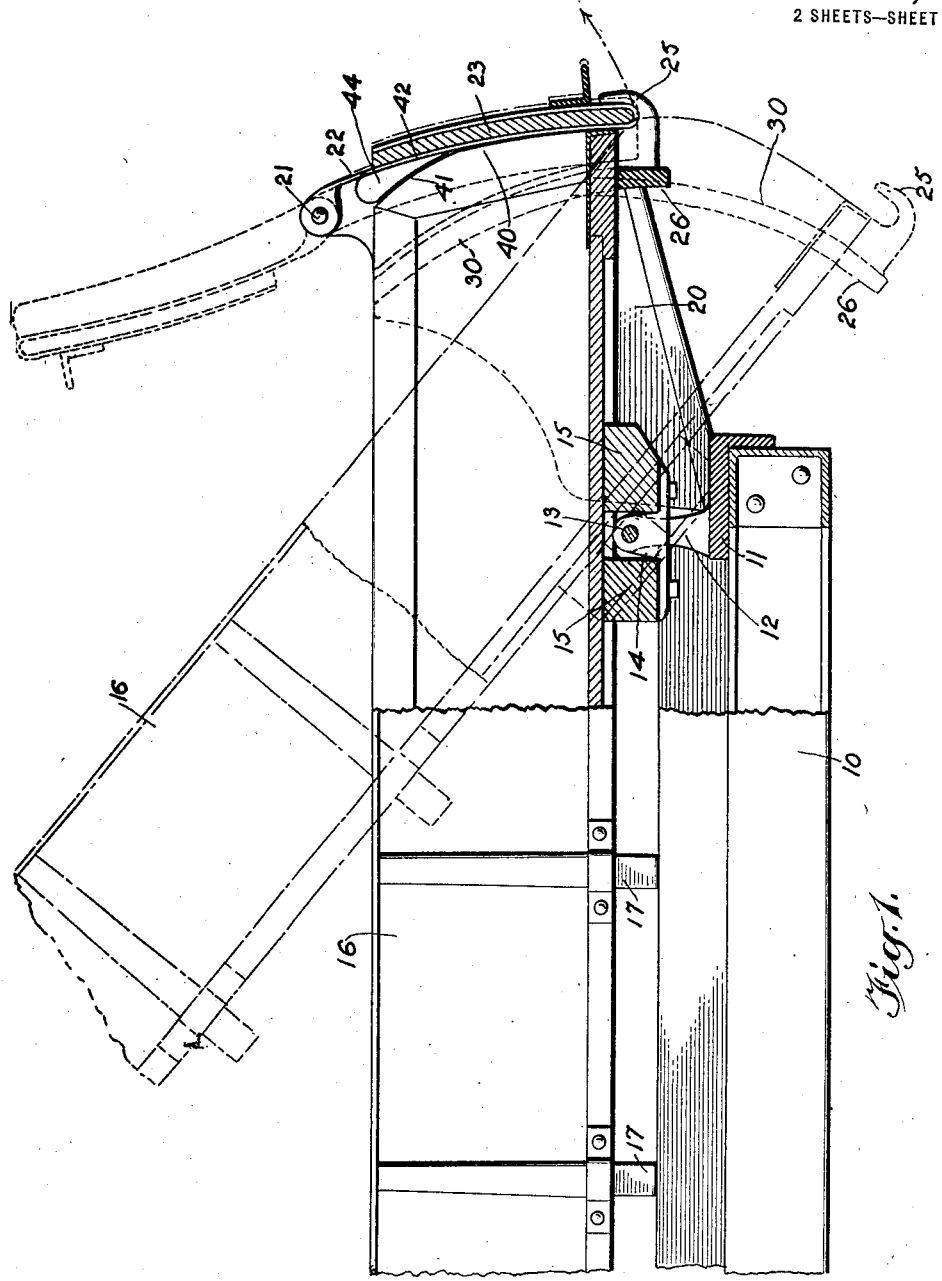

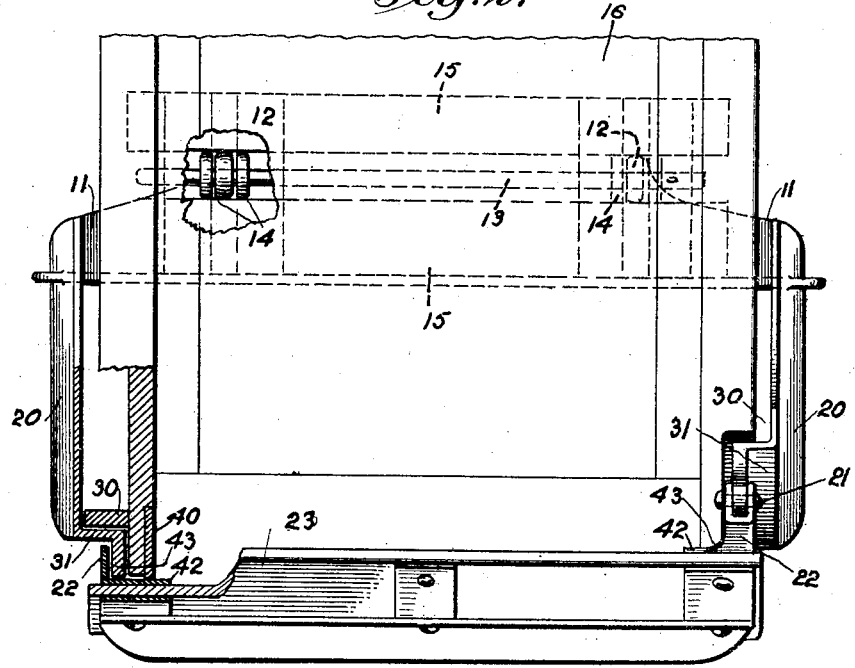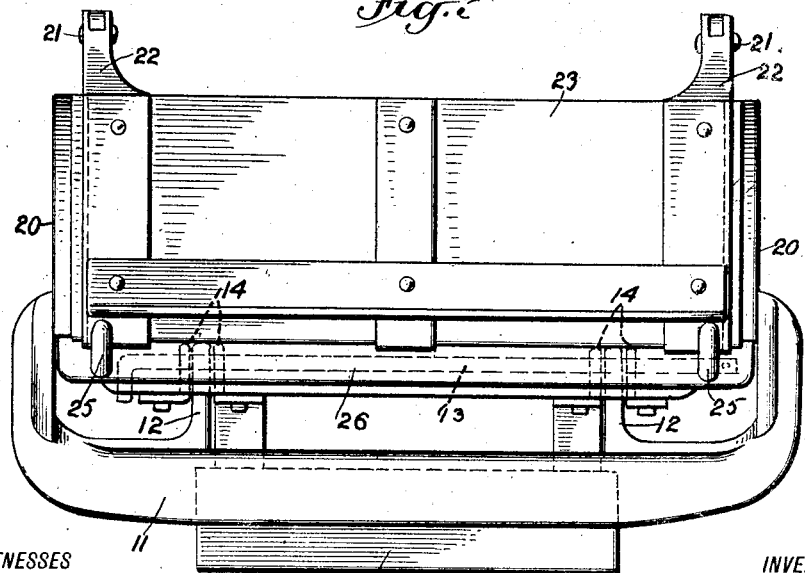

HERMAN MECKING, OF NEW YORK, N. Y.

END-GATE FOR DUMPING-TRUCKS.

1,360,772.　　　　Specification of Letters Patent.　　Patented Nov. 30, 1920.

Application filed August 20, 1919. Serial No. 318,827.

*To all whom it may concern:*

Be it known that I, HERMAN MECKING, a citizen of the United States, and a resident of the city of New York, borough of the Bronx, in the county of Bronx and State of New York, have invented a new and Improved End-Gate for Dumping-Trucks, of which the following is a full, clear, and exact description.

The invention relates to automobile or power driven dumping trucks, and its object is to provide a new and improved self-opening gate or tail-board normally locked in closed position and adapted to automatically move into open position on swinging the body into dumping position. Another object is to allow rocks or other large matter to be dumped to pass out of the wagon body on the latter moving into dumping position and without interference by the gate or tailboard. Another object is to permit the construction of a wagon body of any desired width irrespective of the width of the truck frame and traction wheels thus increasing the capacity of the dumping truck. Another object is to provide a truck which is simple, durable and strong in construction and not liable to get out of order easily.

With these and other objects in view the invention consists of certain novel features of construction, as hereinafter shown and described and then specifically pointed out in the claims.

A practical embodiment of the invention is represented in the accompanying drawings forming a part of this specification, in which similar characters of reference indicate corresponding parts in all the views.

Figure 1 is a sectional side elevation of the dumping truck with parts of the body and truck frame in elevation;

Fig. 2 is a plan view of the same with parts shown in section; and

Fig. 3 is a rear end elevation of the same.

On the rear end of the frame 10 of the automobile truck is secured a transversely extending bar or beam 11 provided with upwardly extending lugs 12 through which passes a transverse pivot 13 also passing through lugs 14 attached to transverse beams 15 secured to the under side of the truck body 16 near the rear end thereof, as plainly illustrated in Fig. 1. The truck body 16 is provided forward of the transverse beams 15 with transverse beams 17 adapted to rest on the truck frame 10 to normally support the truck body 16 in horizontal position. By arranging the pivot 13 in the manner described, the truck body 16 can be swung into dumping position as indicated in dotted lines in Fig. 1 without interference with the rear traction wheels of the automobile truck or with the rear end of the truck frame 10.

The bar or beam 11 projects at both sides beyond the sides of the truck frame 10, as plainly shown in Figs. 2 and 3, and the said bar or beam terminates in upwardly extending side members 20 between which extends the rear end of the truck body 16. The upper ends of the side members 20 are provided with transverse pivots 21 on which are hung side bars 22 attached to the sides of the gate or tailboard 23 which normally closes the rear open end of the truck body 16. The lower end of the gate or tailboard 23 is engaged by locking members 25 in the form of upwardly extending hooks forming part of a crossbar 26 secured to the under side of the bottom of the truck body 16 at the rear end thereof. By reference to Figs. 1 and 3 it will be noticed that the gate or tailboard 23 is locked against opening by the locking members 25 but when the truck body 16 swings into dumping position then the locking members 25 and their bar 26 move downward with the truck body and consequently the locking members 25 move out of engagement with the gate or tailboard 23 thereby unlocking the latter. When the truck body 16 swings back to its normal horizontal position then the locking members 25 reëngage the lower end of the gate or tailboard 23 to lock the latter against accidental opening. From the foregoing it will be seen that when the truck body swings into dumping position its contents can readily slide out of the body underneath the gate or tailboard 23 supported by the side members 20 forming integral parts of the bracket 11 secured to the truck frame 10. It will further be noticed that when the truck body 16 is in its normal horizontal or loading position then the bottom edge of the gate or tailboard 23 rests or is seated on the locking members 25 which latter thus form a support for the gate or tailboard. It will be noticed that when the truck body 16 is in open position then the gate or tailboard 23 is free to swing rearwardly and upwardly and hence rocks or other large matter contained in the truck body and sliding out of the same can readily pass the gate 23 as the latter is free to swing upward. If desired, the gate or tailboard 23 can be swung by the operator upwardly and forwardly into completely open position as indicated in dotted lines in Fig. 1.

The crossbar 26 of the rear end of the truck body 16 terminates at its ends in upwardly extending segmental ribs 30 fitting onto the outer face of the sides of the truck body 16, and the said ribs 30 extend in close proximity to segmental guides 31 formed on the inner faces of the side members 20 of the bar or beam 11 secured to the truck frame 10. The segmental ribs 30 and the guides 31 have their centers coinciding with the axis of the pivot 13 and hence the guides 31 and ribs 30 provide a strong guiding means for guiding the rear end of the truck body 16 on swinging the latter from a normal loading position into a dumping position and vice versa.

The rear ends of the sides of the truck body 16 are provided with reinforcing plates 40 having their upper ends 41 rounded off to properly engage the side bars 22 of the gate or tailboard 23 during the return swinging movement of the truck body 16. The side pieces 22 of the gate or tailboard 23 are provided with wear plates 42 extending along the inner face of the gate or tailboard 23, and the said wear plates 42 are engaged by the outer edges of the reinforcing plates 40, as will be readily understood by reference to Fig. 2. The wear plates 42 normally rest against the outer edges of the rear ends 43 of the side members 20 and the said rear ends 43 sustain the gate or tailboard 23 at the time the truck body 16 is swung into dumping position. Filling pieces 44 are attached to the ends 43 and extend intermediate the curved upper portion 41 of the reinforcing plates 40 and the wear plates 42 of the gate or tailboard 23.

From the foregoing it will be seen that the truck body 16 can be built of any desired width and swung into dumping position without interfering with the truck frame and the wheels, and when the truck body 16 swings into dumping position it unlocks the gate or tailboard 23 and moves away from the same to allow the contents of the truck body to slide out of the same through the open rear end thereof.

It will also be noticed that the bar or beam 11 with its rising sides 20 provides a single strong bracket on which the truck body 16 is fulcrumed, and the gate or tailboard is hung at the same time the side members 20 of this bracket prevent the rear ends of the sides of the truck body from spreading.

Having thus described my invention, I claim as new and desire to secure by Letters Patent:—

1. A dumping truck, comprising a truck frame, a bracket attached to the rear end of the said frame, a body mounted to swing on the said bracket and having an open rear end, a gate hung on the said bracket and normally closing the said rear end, and locking means on the rear end of the said body and engaging the said gate at the time the body is in normal or loading position to lock the gate against opening, the said locking means moving with the body when the latter swings into dumping position thus unlocking the gate.

2. A dumping truck, comprising a truck frame, a body open at its rear end, a bracket attached to the rear end of the said truck frame and provided with a pivot above the truck frame and on which the said body is mounted to swing from normal horizontal or loading position into inclined dumping position, the said bracket having rising side members, and a gate having its upper end pivoted on the upper ends of the said side members, the said gate normally closing the rear open end of the said body, the latter on moving into dumping position moving with its open end out of engagement with the said gate.

3. A dumping truck, comprising a truck frame, a body open at its rear end, a bracket attached to the rear end of the said truck frame and provided with a pivot above the truck frame and on which the said body is mounted to swing from normal horizontal or loading position into inclined dumping position, the said bracket having rising side members, and a gate having its upper end pivoted on the upper ends of the said side members, the said gate normally closing the rear open end of the said body, the latter on moving into dumping position moving with its open end out of engagement with the said gate, the said side members of the bracket having segmental guides at their inner faces and segmental ribs on the sides of the said body and coacting with the said guideways, the center of the said segmental guides and ribs coinciding with the axis of the said pivot.

HERMAN MECKING.